Patented July 3, 1934

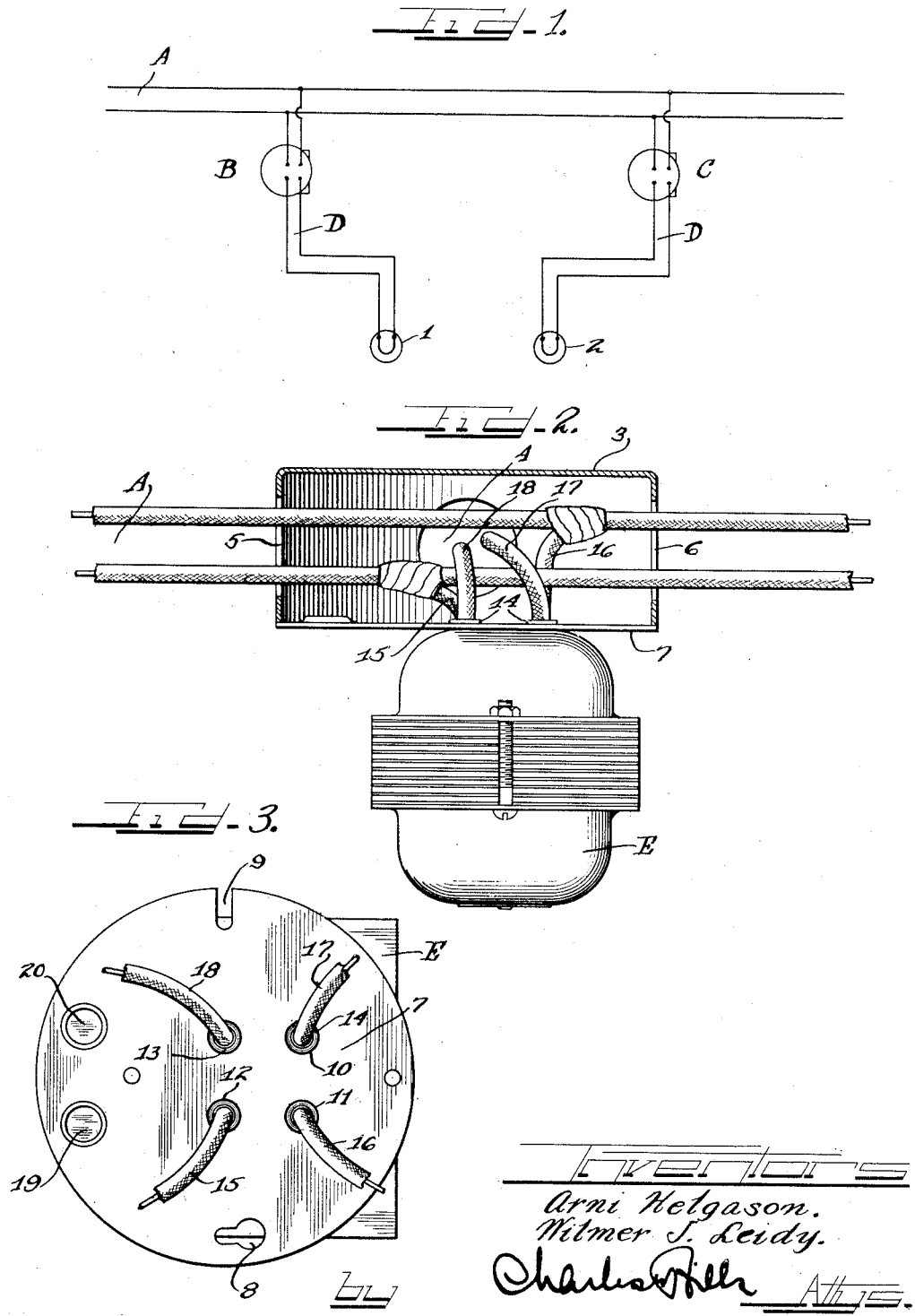

UNITED STATES PATENT OFFICE 1,964,945

TRANSFORMER INSTALLATION

Arni Helgason and Wilmer J. Leidy, Chicago, Ill., assignors to Chicago Transformer Corporation, Chicago, Ill., a corporation of Illinois Application October 31, 1932, Serial No. 640,354

1 Claim. (Cl. 247—20)

The present invention relates to transformer installation and particularly to one which is readily adaptable to outlet or connection boxes for inserting transformers between main and branch lines in circuit relation.

An object of the present invention is to provide transformer construction and installation whereby a transformer may be readily inserted in a line circuit for changing voltage relations between it and a branch circuit.

Another object of the invention is to provide a transformer construction and installation whereby a small transformer may be assembled with a plate serving as a cover member for an outlet box with the primary and secondary leads passing through the plate so that when the plate is attached to the outlet box as a cover for the same the transformer will be supported by the plate and the circuit connections made within the box.

The above, other and further objects of the invention will be apparent from the following description, accompanying drawing and appended claim.

The form of apparatus chosen to exemplify the present invention is illustrated in the accompanying drawing, and the views thereof are as follows:

Figure 1 is a wiring diagram showing schematically the manner of installing the transformer of the present invention.

Figure 2 is a vertical section through an outlet box showing the transformer of the present invention applied to the box in circuit relation.

Figure 3 is a top plan view of the transformer and its attached plate showing the primary and secondary leads projecting through the plate.

The drawing will now be explained.

It oftentimes occurs, especially in factory installations, where comparatively high voltage circuits are employed for operating machinery that lower voltage circuits are required for lighting purposes. In order to avoid one wiring arrangement for the power lines and another wiring arrangement for the lighting circuit the present apparatus has been devised.

Figure 1 represents diagrammatically a main circuit of, say, a voltage of 440 and represented at A are outlet boxes represented diagrammatically at B and C. Transformers of the present invention are applied to the outlet boxes B and C so that secondary connections will provide a voltage of, say, 110 in the circuits designated as D for electric lights 1 and 2.

Figure 2 shows an outlet box of the conventional type indicated at 3, which box is shown as having openings 4, 5 and 6, and so on, for circuit connections to be made within the box. The main line A is shown as passing straight through the box through the openings 5 and 6.

The transformer of the present invention, E, has attached to one side thereof a plate 7 of such shape and configuration as to constitute a cover for the outlet box 3. The plate 7 is secured to the transformer E in any suitable manner. The plate 7 is provided with keyhole-shaped opening 8 and a notch 9 for cooperating with suitable elements in the box structure for securing the plate in position on the box as a cover for the same.

The plate 7 is apertured at 10, 11, 12, 13 which apertures preferably are supplied with insulating bushings 14 through which the several leads from the windings of the transformer pass. There are shown in the present instance the primary leads 15 and 16 projecting through the apertures 11 and 12, and two secondary leads 17 and 18 projecting through the apertures 10 and 13.

The plate 7 is also provided with temporarily closed openings 19 and 20 which, when the plugs are knocked out, become available for additional wires.

Figure 2 illustrates the manner of application of the present apparatus to an outlet or junction box 3 and shows the plate 7 applied to the lower faces of such box and serving as a closure or cover for the box. When the transformer is connected to an outlet box, the plate 7 is applied over the open face of the box after the various leads of the transformer have suitably been connected in circuit relation within the box. Figure 2 illustrates the primary leads 15 and 16 as connected to the wires of the main or power circuit A and shows the leads 17 and 18 as passing through the opening 4 in the box. The ends of the leads 17 and 18 are, of course, suitably connected in circuit relation with wires leading therefrom to, for instance, the lamps 1 and 2.

It will be observed that the present invention provides a transformer readily adaptable for application to an outlet or connection box wherever it is necessary to take off a branch line from a main line. The boxes 3 may be installed in suitable positions along the main line for supporting the transformers so that the leads from the transformers may be suitably connected in circuit relation with the main and branch lines.

The invention is claimed as follows:

In combination, a metallic junction box, high voltage power lines in a motor circuit extending through said box, a metallic cover on said box, a power transformer secured to and supported by said cover and seated on the outer surface of the cover, said power transformer being adapted to step down from the voltage of the motor circuit to the voltage of a lighting circuit, leads from the primary of said transformer extending through said cover and connected to said high voltage lines within said junction box, and leads from the secondary of said transformer extending through said cover and through the wall of said junction box.

ARNI HELGASON.
WILMER J. LEIDY.